Jan. 31, 1928.
J. P. SYKES ET AL
1,657,943
VALVE GRINDING MACHINE
Filed May 4, 1926   2 Sheets-Sheet 2
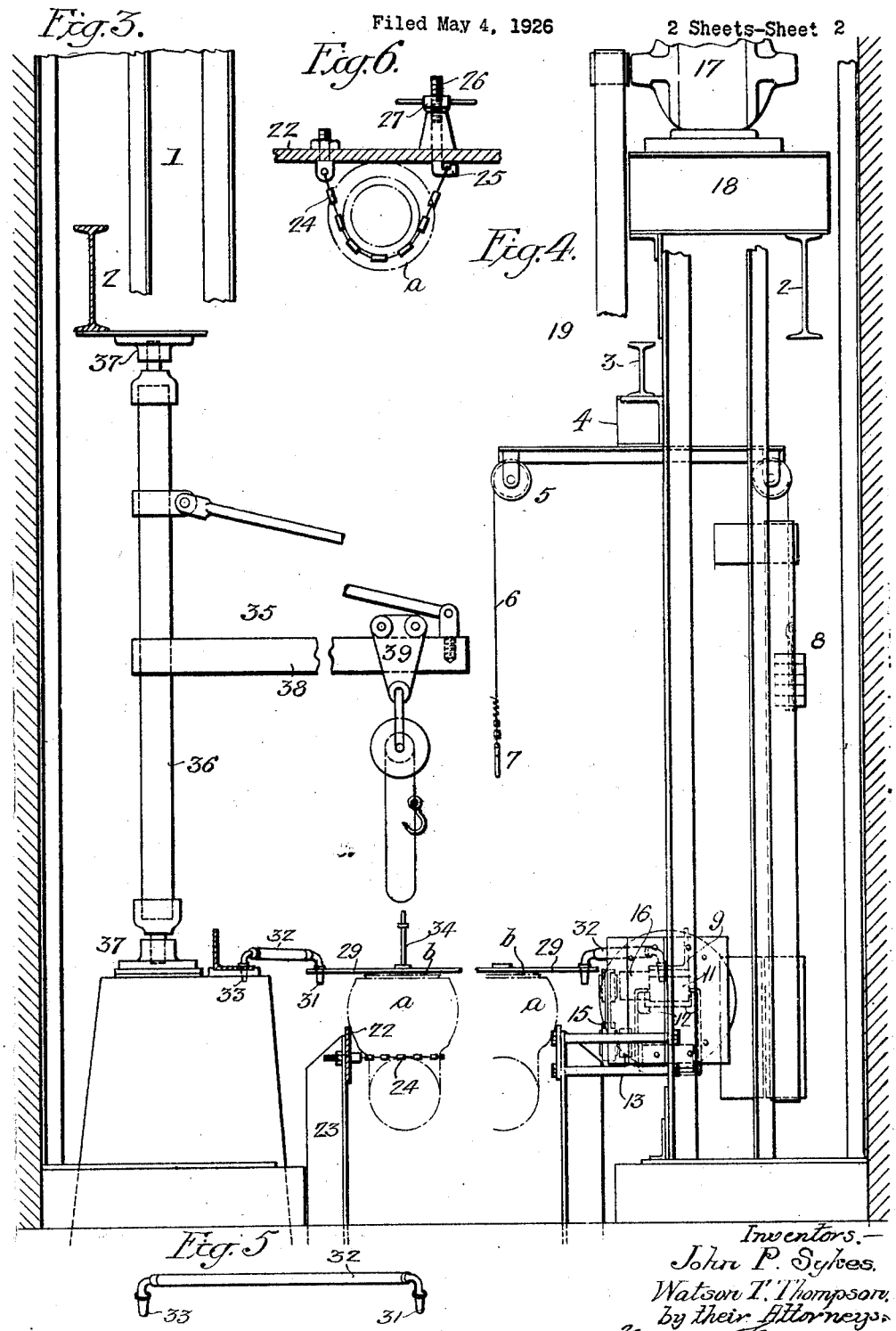
Inventors.—
John P. Sykes,
Watson T. Thompson,
by their Attorneys, Patented Jan. 31, 1928.

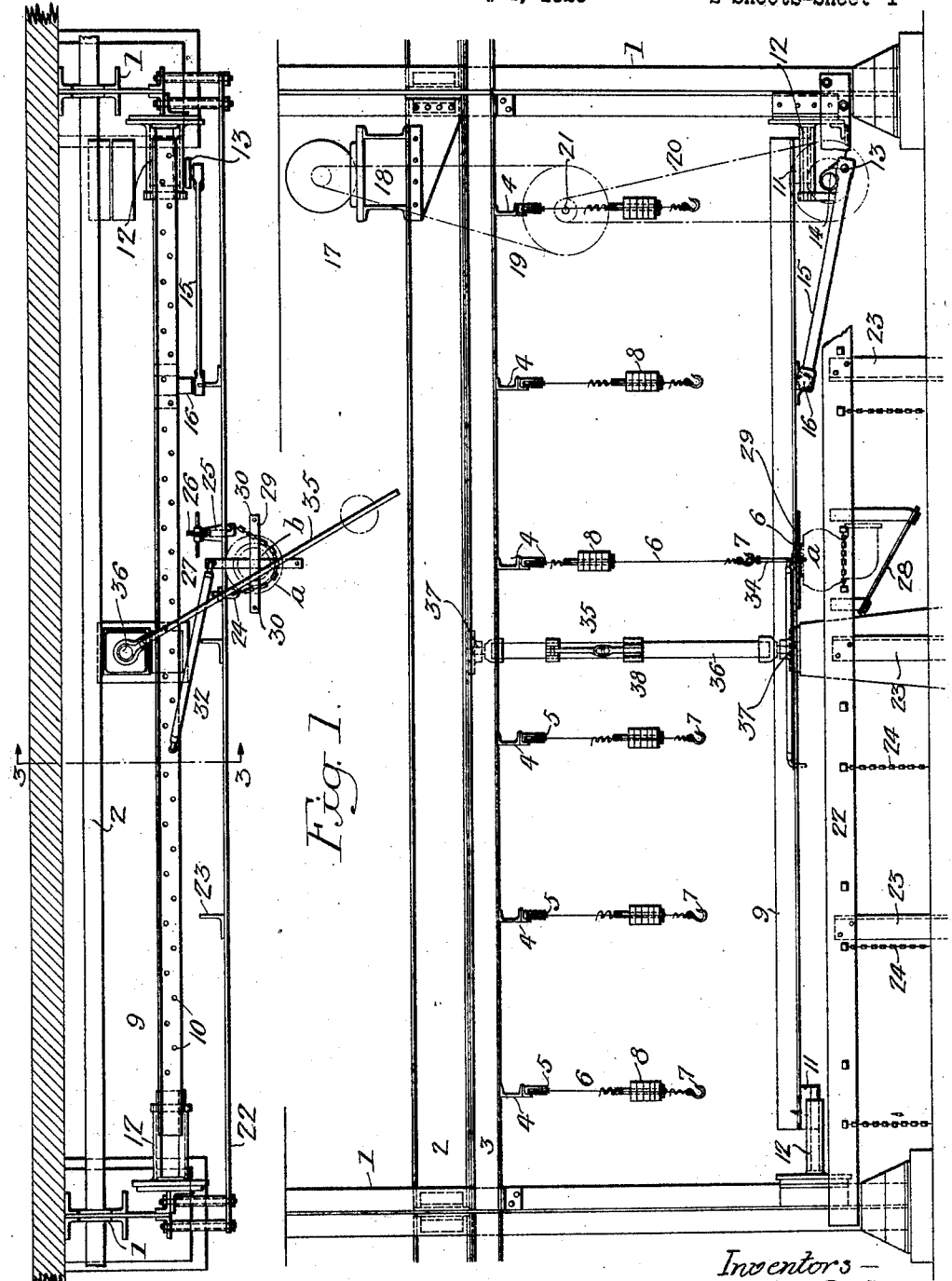

1,657,943

UNITED STATES PATENT OFFICE.

JOHN P. SYKES, OF WALLINGFORD, AND WATSON T. THOMPSON, OF PHILADELPHIA, PENNSYLVANIA, ASSIGNORS TO THE BALDWIN LOCOMOTIVE WORKS, OF PHILADELPHIA, PENNSYLVANIA, A CORPORATION OF PENNSYLVANIA.

VALVE-GRINDING MACHINE.

Application filed May 4, 1926. Serial No. 106,682.

The object of our invention is to design a machine for accurately and quickly grinding valves to their seats.

The invention is particularly adapted for grinding locomotive throttle-valves to the seats in the valve-casing.

The machine is so designed that a number of valves can be ground at the same time.

In the accompanying drawings:

Fig. 1 is a front elevation of our improved machine for grinding valves to their seats;

Fig. 2 is a plan view;

Fig. 3 is a sectional view on the line 3—3, Fig. 2;

Fig. 4 is an end view;

Fig. 5 is a detached view of the connecting rod; and

Fig. 6 is an enlarged detached view showing the means for holding the valve-casing to the anchor-bar.

1 are two standards mounted on suitable foundations, and 2 is a connecting beam. The standards, as well as the beam 2 in the present instance are part of the frame-work of a building, but they may be separate structures if desired. 3 is a longitudinal beam to which channel-bars 4 are attached, which carry the wheels 5 over which passes the wire-rope 6, having a hook 7 at one end and a counter-balance weight 8 at the opposite end. This arrangement is provided for counter-balancing the valve during the grinding operation.

9 is an angle-bar extending substantially the full length of the machine, and in one portion of this bar are perforations 10 located a given distance apart as shown in Fig. 2. The bar 9 has slides 11 at each end adapted to fixed slideways 12 attached to the frame of the machine. The bar 9 is reciprocated by means of a crank 13 on a shaft 14 through a connecting rod 15 attached to a bearing 16 on the underside of the bar 9, as shown in Fig. 1.

The shaft 14 is driven from a motor 17, mounted on short cross-beams 18, which are carried by the main beam 2, and the shaft is driven through belts 19 and 20 and wheels on a counter-shaft 21, as clearly shown in dotted lines in Fig. 1. It will be understood, however, that the shaft 14 may be driven in any suitable manner without departing from the main features of the invention.

At the front of the machine is an anchoring-bar 22, supported at intervals by uprights 23 and attached to the standards 1 as shown in Fig. 2. Attached to the anchor-bar are a series of chains 24, the free end of each chain being adapted to be engaged by a hook 25 having a threaded portion 26 which can be adjusted by a nut 27. The chain is placed around a valve-casing $a$, as shown by dotted lines in Figs. 1, 2 and 3, and when engaged by the hook 25 it is tightened, firmly holding the valve-casing in position.

An inclined support 28 may be provided for larger valve-casings than that shown in the drawings, and this support may be used in guiding the valve-casing to position. Within the valve-casing is a valve $b$, to which is attached a four-armed frame 29. Each arm has at its outer end a hole 30 for the reception of one of the pins 31 on a connecting rod 32. The other pin 33 of the rod is adapted to enter one of the holes 10 in the reciprocating bar 9. When motion is imparted to the bar 9, a reciprocating motion is imparted to the valve through the connecting rod 32 and frame 29.

By providing the frame 29 with a number of arms, the position of the valve in the casing can be adjusted by disconnecting the rod 32 and turning the valve, so as to bring one or more of the arms into position to be engaged by the connecting rod. It will be understood that the valve is turned less than one revolution at each reciprocation.

In order to counter-balance the valve $b$ or to reduce the weight of the valve, we use the counter-balancing mechanism described above. The hook 7 attached to the wire-rope 6 engages a pin 34 attached to the valve, and the weights 8 may regulate the pressure of the valve on its seat.

While we have shown one connecting rod in the drawings, it will be understood that a series of valves may be ground at the same time. When the grinding of the valve is completed, that particular valve can be readily removed after detaching the connecting rod and without interfering with the grinding of the other rods, and another casing can be placed in position while the machine is running, and the valve 29 can be connected to the reciprocating bar 9.

In order to handle the valve-casings, particularly the heavy locomotive valve-casings, a crane 35 is provided, having a mast 36 adapted to upper and lower bearings 37, and having a boom 38. On this boom is a trolley 39 of the ordinary type.

We claim:—

1. The combination in a valve grinding machine, of a frame; a reciprocating bar; means reciprocating said bar; an anchor-bar; means for securing the valve-casing to the anchor-bar; a frame to which the valve is attached; and a rod connecting the frame to the reciprocating bar.

2. The combination in a valve grinding machine, of a frame; a reciprocating bar; means for reciprocating the bar; an anchor-bar; means for attaching a valve-casing to the anchor-bar; a valve frame to which the valve is attached, said frame having a plurality of arms; and a rod connecting one of the arms of the frame to the reciprocating bar.

3. The combination in a valve grinding machine; of a frame; a reciprocating bar having a series of perforations therein spaced a given distance apart; an anchor-bar located in front of the reciprocating bar; a series of chains attached to the anchor-bar; adjustable hooks arranged to engage a chain so as to hold the valve-casing in position on the anchor-bar; a valve frame arranged to be secured to a valve, said frame having a plurality of arms; and a detachable rod connecting one of the arms of each valve frame to the reciprocating bar.

4. The combination in a valve grinding machine, of a frame; a reciprocating bar; means for reciprocating the bar; an anchor-bar; means on the anchor-bar for holding a valve-casing in position; a frame to which the valve is attached; a detachable rod connecting the frame to the reciprocating bar; and overhead counter-balance mechanism arranged to be attached to the valve to relieve the valve seat of a certain amount of pressure.

5. The combination in a valve grinding machine, of a frame; a bar having slits at each end adapted to fixed slideways; a shaft having a crank thereon; a rod connecting the crank with the bar so as to allow it to reciprocate, said bar having a series of perforations therein; a longitudinal anchor-plate located in front of the reciprocating bar; means on the anchor-plate for securing a series of valve-casings thereon; a frame having a plurality of arms and arranged to be attached to the valve; a detachable rod connecting one of the arms of the frame with the perforated reciprocating bar; and overhead counter-balancing mechanism consisting of a wire-rope having at one end a hook arranged to engage a pin on the valve and having at the opposite end an adjustable counter-balance weight.

JOHN P. SYKES.
WATSON T. THOMPSON.